UNITED STATES PATENT OFFICE.

WILHELM HERZBERG AND OSCAR SPENGLER, OF BERLIN, GERMANY, ASSIGNORS TO ACTIEN GESELLSCHAFT FÜR ANILIN FABRIKATION, OF BERLIN, GERMANY.

ORTHO-OXY-MONOAZO DYE AND PROCESS OF MAKING SAME.

No. 906,421.  Specification of Letters Patent.  Patented Dec. 8, 1908.

Application filed June 24, 1907. Serial No. 380,621.

*To all whom it may concern:*

Be it known that we, WILHELM HERZBERG and OSCAR SPENGLER, subjects of the Emperor of Germany, residing at Berlin, Hagelsbergerstrasse 10°, and Berlin, Lohmühlenstrasse 67, Germany, have invented certain new and useful Improvements in New Ortho-Oxy-Monoazo Coloring-Matters and Processes of Making the Same, of which the following is a specification.

The present invention relates to new ortho-oxyazo-coloring matters derived from picramic acid and is based on the observation that by treating an azo-dyestuff of the following general formula:

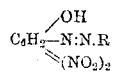

wherein R represents an acid such as a naphtholsulfonic acid, an amidonaphtholsulfonic acid, a naphthylaminsulfonic acid, a dioxynaphthalenesulfonic acid or the like, with a hydrosulfid of an alkaline earth metal there are obtained the corresponding nitroamido-dyestuffs, the reaction giving a good yield. This result is very surprising because by the action of sodium sulfid the aforesaid dinitro-dyestuffs cannot be converted into these nitroamido-compounds, decomposition occurring in this case to a great extent or even completely. The dyestuffs thus produced possess the following general formula:

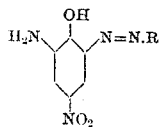

in which formula R represents a suitable azo-dyestuff component of the naphthalene series as above set forth; they dye wool from an acid bath, generally speaking, from brown to black shades, which shades by a subsequent treatment with oxidizing chromium compounds are converted into from dark brown to black or blackish olive green tints, which tints are, generally speaking, very fast to milling and potting.

In carrying out the reaction it is not necessary to use such a hydrosulfid in the isolated form; instead there may be used for instance a mixture of sodium sulfid and a suitable salt of an alkaline earth metal, which mixture is preferably prepared in solution immediately before carrying out the operation.

The following example illustrates the invention, the parts being by weight: From 17, 1 part of picramic acid and 22.2 parts of the sodium salt of 2.6-naphtholsulfonic acid there is prepared in the usual manner a monoazo-dyestuff. This dyestuff is then, in the form of a rather thick paste, poured into 150 parts of water, and to this mixture are added 6 parts of calcium hydrate (slaked lime), in order to fix the OH-group of the sodium naphtholsulfonate. After heating the mass to 90-100° centigrade a solution of calcium hydrosulfid is introduced which is prepared by dissolving 65 parts of crystallized sodium sulfid and 32 parts of dry calcium chlorid together in 100 parts of water and filtering the solution thus obtained. The reaction, *i. e.* the reduction of the nitro-group in the azo-dyestuff, proceeds very quickly. The reaction being finished, the solution is feebly acidified with acetic acid and the dyestuff is then precipitated by adding common salt, whereafter it is obtained by filtering, pressing and drying. The product thus obtained produces on wool in an acid bath brownish tints, which by a subsequent treatment with oxidizing chromium compounds is converted into a very dark brown red. The tints thus obtained are distinguished by a very great fastness to milling and potting.

According to the method given in the foregoing example a great number of monoazo-dyestuffs derived from picramic acid may be reduced, thus forming a large series of new nitro-amido-ortho-oxyazo-dyestuffs. Thus for instance from the following sulfonic acids of the naphthalene series the corresponding nitro-amido-dyestuff may be obtained which produces tints on wool as given in the following table.

| | Dyes wool— | |
|---|---|---|
| | In acid bath— | By after-treatment with a bichromate changing to— |
| 1.4-naphtholsulfonic acid. | brownish black. | dark red-brown. |
| 1.5-naphtholsulfonic acid. | brownish black. | dark reddish brown. |
| 1.8-amidonaphthol-4-sulfonic acid. | blue-black. | greenish black. |
| 2.5-amidonaphthol-7-sulfonic acid. | red-brown. | brownish black. |
| 2.8-amidonaphthol-6-sulfonic acid. | brown. | brown-black. |
| 1.4-naphthylamin-sulfonic acid. | red-brown. | greenish black. |
| 2.6-naphthylamin-sulfonic acid. | yellow-brown. | greenish brown. |
| 1.8-dioxynaphthalene-3.6-disulfonic acid. | violet. | greenish black. |

It is obvious to those skilled in the art that our present invention is not limited to the foregoing example or to the details given therein. For instance, instead of the mixture of sodium sulfid and calcium chlorid used in the foregoing example a mixture of sodium sulfid or potassium sulfid with a suitable salt of another alkaline earth metal, such as for instance barium chlorid, may be employed. Moreover, the proportions of the respective alkali-monosulfid and of the salt of the alkaline earth metal may vary to some extent; more especially these proportions as well as the temperature at which the reaction is carried out, and the duration of the heating depend upon the special nature of the monoazo-dyestuff to be reduced and must be selected accordingly in order to obtain the best results.

Having now described our invention and the manner in which the same is to be performed what we claim is,—

1. The herein-before described process for the production of new ortho-oxy-monoazo-coloring matters of the general formula:

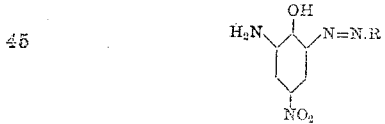

in which formula R represents such an azo-dyestuff component of the naphthalene series as set forth in the foregoing specification, by acting with a hydrosulfid of an alkaline earth metal upon a monoazo-dyestuff obtained by diazotizing picramic acid and combining the diazo-compound formed with an azo-dyestuff-component of the naphthalene series.

2. As new articles of manufacture the new ortho-oxy-monoazo-coloring matters of the above given general formula, which may be obtained by acting with a hydrosulfid of an alkaline earth metal upon a monoazo-dyestuff obtained by diazotizing picramic acid and combining the diazo-compound formed with a suitable azo-dyestuff-component of the naphthalene series, which dyestuffs dye wool from an acid bath shades varying from brown to black, which shades on a subsequent treatment with an oxidizing chromium compound are converted into from dark brown to deep black tints, these tints being distinguished by a very great fastness to milling and potting, and which coloring matters by the action of a strong reducing agent are split up, whereby results 2.4.6-triamidophenol besides the amido-derivative of the naphthol-compound used in forming the parent monoazo-dyestuff derived from picramic acid.

3. As a new article of manufacture the new ortho-oxy-monoazo-dyestuff of the formula:

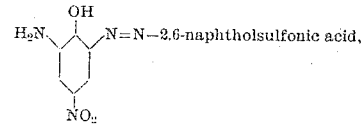

which may be obtained by acting with a mixture of sodium sulfid and calcium chlorid upon the monoazo-dyestuff derived from picramic acid by diazotizing this acid and combining the diazo-compound formed with 2.6-naphthol-sulfonic acid, which dyestuff dyes wool from an acid bath brownish tints which by a subsequent treatment with an oxidizing chromium compound are converted into a very dark brown-red, this shade being distinguished by a very great fastness to milling and potting, and which new coloring matter by the action of a strong reducing agent is split up, resulting thereby 2.4.6-triamidophenol besides 1.2-amidonaphthol-6-sulfonic acid, this dyestuff being in the shape of its sodium salt when pulverized a dark brown powder, having a metallic luster, which sodium salt dissolves in water to a blackish violet colored solution, which solution on addition of acetic acid assumes a brown-yellow coloration and which solution on addition of hydrochloric acid separates a brown-yellow precipitate, and which solution on the addition of soda-lye assumes a red-brown coloration, whereas by the addition of ammonia the solution becomes more reddish, this sodium salt dissolving in concentrated sulfuric acid to a ruby-colored solution which solution on addition of ice separates a brown-yellow precipitate, and which sodium salt is very sparingly soluble in alcohol, the alcohol assuming a slightly red color.

In testimony whereof we have hereunto set our hands in presence of two subscribing witnesses.

WILHELM HERZBERG.
OSCAR SPENGLER.

Witnesses:
HENRY HASPER,
WOLDEMAR HAUPT.